United States Patent Office 3,396,215
Patented Aug. 6, 1968

3,396,215
PROCESS FOR THE PREPARATION OF A PROPELLANT GRAIN
Earl J. Hittinger, Danville, Ill., assignor to Standard Oil Company, Chicago, Ill., a corporation of Indiana
No Drawing. Filed Dec. 29, 1965, Ser. No. 517,473
5 Claims. (Cl. 264—3)

ABSTRACT OF THE DISCLOSURE

Process for the preparation of a propellant composition or grain having an oxidizer and a combustible thermoplastic material comprising the steps of dry mixing the ingredients and then heating the mixture to its softening point.

---

This invention relates to solid propellants having a thermoplastic binder and more particularly to a simplified method for producing said propellant. The method of the present invention is described herein as applied to the production of propellants containing ammonium nitrate as the principal oxidizing agent; however, this should not be deemed a limitation of the method.

In gas generation for rocket or missile usage, it is desirable that the gas affording composition develop gas at a controlled rate. Ammonium nitrate compositions consist essentially of ammonium nitrate particles in an oxidizable organic material (binder) and various other additives such as catalyst for the promotion of combustion, carbon, chemical stabilizer to reduce decomposition, etc. To improve the burning quality, and to utilize the excess free oxygen made available by the decomposition of the ammonium nitrate, oxidizable organic material, which also may function as binder material for the shaping of the ammonium nitrate into grains, are admixed with ammonium nitrate. These oxidizable organic materials may be any thermoplastic known to the art for use in propellant compositions.

The multi-component binder or matrix former commonly consists of a polymeric base material and a plasticizer therefor. Particularly suitable polymeric base materials are cellulose esters of alkanoic acids containing from 2–4 carbon atoms such as cellulose acetate, cellulose butyrate and cellulose propionate.

The polyvinyl resins such as polyvinyl chloride and polyvinyl acetate are also good bases; styrene acrylonitrile is an example of a copolymer which forms a good material; polyacrylonitrile is another suitable base material; as are polyamide resins (such as nylons).

The plasticizer component of the binder also, preferably, contains combined oxygen. The oxygen may be present in the plasticizer as an ether linkage and/or hydroxyl and/or carbonyl; also the oxygen may be present as an inorganic substituent, particularly a nitro group.

In general, any plasticizer which is adapted to plasticize the particular polymer may be used. A single plasticizing compound may be used; more usually 2 or more compounds are used in conjunction; for example, acetyl triethyl citrate and triethyl citrate, etc.

The particular requirements with respect to use will determine not only the polymer but also the particular plasticizer or combination of plasticizers which are used. The precise amount of binder is dependent upon the type of material forming the binder as well as the requirements for the particular grain.

The requirement for a solid propellant that is suitable for military use is that it be ballistically stable after long periods of storage at temperatures between +160° F. to −65° F. Many binders have been used to form a shaped solid propellant and include those listed above. The binder material used with the ammonium nitrate to form physically stable grains must be flexible to compensate for changes in volume of the ammonium nitrate as it passes from one temperature to another, since ammonium nitrate exists in several solid forms depending upon the temperature. The binder material must compensate for the changes in the volume in order that such changes will produce a minimum amount of voids and cracks in the grains. Production of fissures in the grain either internally or externally over the surface of the grain creates additional burning surface which results in unpredictability of the ballistic performance of the grain. Thus, it is necessary to provide a binder material which will provide a shaped grain of satisfactory physical sensibility. Furthermore, such grain must be capable of being ignited at extremely low or relatively high temperatures after being subjected to variable storage temperature conditions and to burn evenly and at such a rate as to distribute the impulse energy in accordance with the service required.

Finely powdered ammonium nitrate contains about 20% or more by volume of void space, and this void space must be completely filled in order to obtain a shaped propellant grain of the desired physical characteristics. Moreover, additional void space is provided when using an inorganic compound as the catalyst, and the binder must not only fill the voids of the ammonium nitrate but also the voids present in the finely powdered inorganic catalyst material.

For military uses, a propellant is desired which has non-detonating characteristics rather than the detonating characteristics of ordinary ammonium nitrate explosives. The burning characteristics of non-detonating explosives are dependent upon the temperature and pressure in the combustion chamber. An initially high temperature of the grain will cause the propellant to operate at a higher combustion pressure and thrust than will a cooler temperature. The firing duration will be shorter, but the total impulse will not be changed significantly. This indicates that the initial temperature of the grain has a decided effect on the burning rate and that weather conditions have to be considered when exacting performance requirements are to be met.

The velocity at which a solid propellant is consumed during operation is called the burning rate. It is measured in a direction normal to the propellant surface and is usually expressed in inches per second. The burning rate may be expressed by the following relation, in which the influence of all performance parameters is small compared to the chamber pressure and the initial grain temperature.

$$r = ap_c^n$$

The burning rate or velocity of propellant consumption $r$ is usually given in inches per second; the chamber pressure $p_c$ in pounds per square inch; $a$ and $n$ are constants. The constant $a$ varies with the initial propellant temperature, and thus the burning rate is a function of the temperature of the grain prior to combustion. For most operations it is desirable that the value of $r$ be as large as possible. The lower value of $n$, the less is the detonating character of the decomposition of a gas producing composition and the more even and smooth is the burning rate of the propellant grain. Thus, a sustained thrust rather than a detonation is obtained by smooth burning of the grain.

The temperature sensitivity for different solid propellants is usually expressed as the percentage change of thrust per unit of temperature change. Temperature changes effect the equilibrium pressure and the burning rate. The definitions of the temperature coefficients are given by Sutton, "Rocket Propulsion Elements" (2nd ed. 1958).

$$\pi_K = \left(\frac{\delta \ln p}{\delta T}\right)_K = \frac{1}{p_c}\left(\frac{\delta p}{\delta T}\right)_K$$

$$\sigma_p = \left(\frac{\delta \ln r}{\delta T}\right)_p = \frac{1}{r}\left(\frac{\delta r}{\delta T}\right)_p$$

Here $\pi_K$ is the temperature sensitivity coefficient of equilibrium pressure at a particular value of K (K is the ratio of the burning surface to the throat area), expressed in percent pressure change per degree temperature change. Mathematically it is defined as the partial derivative of the natural logarithm of the equilibrium chamber pressure $p$ with respect to temperature T. The other temperature sensitivity coefficient $\sigma_p$ refers to the change in burning rate $r$ of a solid propellant with respect to temperature T at a particular value of chamber pressure $p_c$. It is also known as the burning rate temperature coefficient, while $\pi_K$ is known as the temperature sensitivity of pressure.

For most propellant applications, as low a temperature coefficient as possible is desirable and even required for engineering design consideration. Lower levels over a given temperature level allows a sizable weight savings for most missile applications.

In the past, production of a propellant grain, meeting the crucial ballistic standards exacted on propellant producers, was a laborious, expensive and time-consuming process. The typical preferred prior art method, commonly referred to as sigma blade mixing, of preparing a propellant composition involves the following steps: The preformed thermo-plastic binder is introduced into a preheated mixer and is further heated until the softening point of the binder is reached. The mixer is a 100 gallon dispersion mixer containing twin sigma shaped blades rotating at 25 r.p.m. It is steam jacketed to permit the addition of heat, which may be up to 125° C. The oxidizer is then added and mixing and heating continued. Other desirable additives are also added, for example, catalyst, stabilizers, ignition additives, etc. Mixing is then continued until the composition attains the desired ballistic properties. This may be for a period of from 20 minutes to 3 hours. In most cases, the individual ingredients will have to be ground prior to introduction into the mixer in order to attain the desired ballistic properties.

A simplified economical process for the production of a propellant grain comprising a propellant composition containing a combustible thermo-plastic binder material, has now been discovered. Very briefly, the process of the present invention is described as follows: The propellant composition is physically pre-blended and then heated to its softening point. The composition may then be molded in a conventional manner.

The above process, referred to as the "dry blend process," offers the advantage of ease of processing, larger lot size and ballistic reliability, with subsequent overall reduced manufacturing costs. Thus, by separating mixing and heating of dry powders, the propellant processing is reduced to a continuous machine operation.

More specifically, the procedure is as follows: The oxidizer is ground to a size suitable for the use which a particular propellant is to be put, as is the preformed binder. It is well-known in the art that particle size and size distribution within a composition are related to burn rate, pressure exponent and temperature coefficients. The amount of grinding will then depend upon the desired properties of the propellant. It is preferable that 75% of the oxidizer be ground to a particle size of between 25 and 250 microns and the remaining 25% be either above or below that. It is also preferable that 75% of the binder be ground to a particle size of between 50 and 300 microns and the remaining 25% be above or below that. The process of this invention allows a much higher degree of control of particle size and distribution as compared with the prior art methods. In the sigma blade method, grinding and blending were accomplished in one mixer so that it was nearly impossible to control the degree of size distribution within the composition. In the present process it may be unnecessary to grind the particles if the larger sized particles will give the desired ballistic properties.

The ingredients are then introduced into a blender. A preferred blender is a rotating or tumbling action mixer which causes complete distribution of the particles without further particle break-down. Mixing time is extremely short and may be accomplished in from 10 to 20 minutes.

The mixture may then be heated in any manner known to the art, e.g. oven heating, dielectric heating, etc. The mixture is heated to its softening point or above.

The above procedure offers the further advantage of not being bound within the strict limitations as contained in a sigma blade mixer. The sigma blade mixer is limited in the quantity of the propellant composition which may be processed during a given cycle.

It should be noted that the present invention may be used in conjunction with extrusion through an orifice prior to molding for improvement in ballistic properties. If such extrusion technique is to be used, then a nozzle diameter size and the propellant temperature must be carefully regulated to obtain improvement. A preferred diameter size is from 1/16 to 3/4 of an inch, and a temperature of from 100° C. to 125° C. is preferred.

Example I

The following propellant formulation was used in preparing a propellant:

| | Percent |
|---|---|
| Ammonium Nitrate | 62.30 |
| Cellulose Acetate (HLFS 85P) | 10.40 |
| Acetyl Triethyl Citrate | 11.60 |
| Dinitrophenoxy Ethanol | 10.50 |
| Carbon Black (Texas E) | 3.00 |
| Sodium Barbiturate | 1.00 |
| Toluene Diamine | 0.80 |
| N-Phenylmorpholine | 0.20 |
| Ammonium Oxalate | 0.20 |

The ammonium nitrate was ground to 270–325 mesh size and the preformed binder was ground to a 120 mesh size. All the above propellant ingredients were then dry mixed in a rotating container. The resulting dry blend was then placed in an oven and heated to 95±5° C. and the heated propellant was then molded and cut into strands for testing in a Crawford bomb. The results of the test are as follows: $r = 0.064$ inches per second; $\pi_K = .32$; and $\sigma_p = .15$ percent per ° F.

What is claimed is:
1. A process for the preparation of a propellant composition having desired ballistic properties, said composition containing an oxidizer and a combustible thermoplastic material, said thermoplastic material being the sole source of fuel, which process consists of:
   (a) dry mixing the ingredients of said propellant composition; and
   (b) heating said composition at least to its softening point sufficient to impart to said composition, said ballistic properties.

2. The process of claim 1 wherein the propellant composition consists essentially of ammonium nitrate as a primary oxidant.

3. The process of claim 1 wherein 75% of the ingredients of said composition are ground to a size of between 25 and 300 microns.

4. A process for the preparation of a propellant grain comprising a propellant composition having desired ballistic properties, said composition containing a combustible thermoplastic binder material, said binder material being the sole source of fuel, and ammonium nitrate as the primary oxidant, which process consists of:
   (a) grinding the ingredients of said propellant composition to a size suitable for propellant use;

(b) dry mixing said ingredients;
(c) heating said propellant composition at least to its softening point sufficient to impart to said composition, said ballistic properties; and
(d) forming a shaped grain of said propellant composition.

5. A process for the preparation of a propellant grain comprising a propellant composition having desired ballistic properties, said composition containing an oxidizer and a combustible thermoplastic material, said thermoplastic material being the sole source of fuel, which process consists of:

(a) dry mixing the ingredients of said propellant composition;

(b) heating said composition at least to its softening point sufficient to impart to said composition, said ballistic properties; and
(c) forming a shaped grain of said propellant composition.

References Cited
UNITED STATES PATENTS

| | | | |
|---|---|---|---|
| 435,842 | 9/1890 | Lamm | 264—3 |
| 2,929,697 | 3/1960 | Perry et al. | 264—3 |
| 2,939,176 | 6/1960 | Adelman | 264—3 |
| 2,970,046 | 1/1961 | Cutforth | 149—19 |
| 3,004,840 | 10/1961 | Pruitt et al. | 149—19 |

L. DEWAYNE RUTLEDGE, *Primary Examiner.*

UNITED STATES PATENT OFFICE
CERTIFICATE OF CORRECTION

Patent No. 3,396,215

August 6, 1968

Earl J. Hittinger

It is certified that error appears in the above identified patent and that said Letters Patent are hereby corrected as shown below:

Column 1, line 49, after "good" insert -- base --. Column 3, line 23, after "Lower" insert -- pressure --.

Signed and sealed this 13th day of January 1970.

(SEAL)
Attest:

Edward M. Fletcher, Jr.
Attesting Officer

WILLIAM E. SCHUYLER, JR.
Commissioner of Patents